E. CHOATE.
Wash-Boiler Attachments.

No. 134,420. Patented Dec. 31, 1872.

Witnesses:
A. W. Almqvist
Sedgwick

Inventor:
E. Choate
per Munn & Co.
Attorneys.

UNITED STATES PATENT OFFICE.

EDWARD CHOATE, OF NEW YORK, N. Y.

IMPROVEMENT IN WASH-BOILER ATTACHMENTS.

Specification forming part of Letters Patent No. 134,420, dated December 31, 1872.

*To all whom it may concern:*

Figure 1:
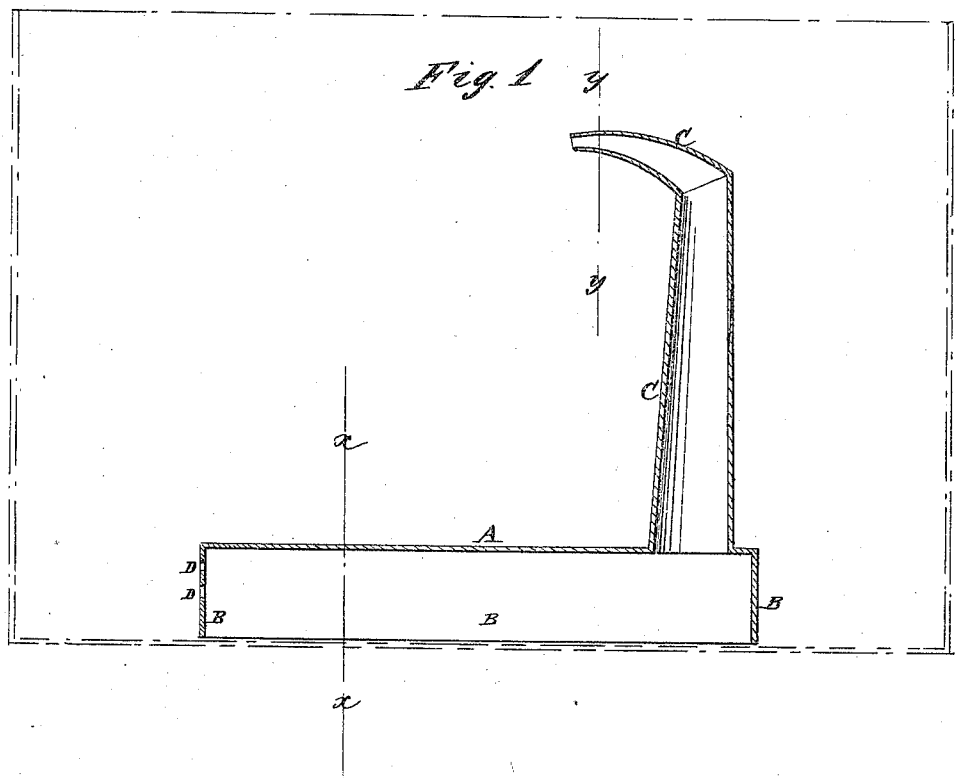
Figure 2:
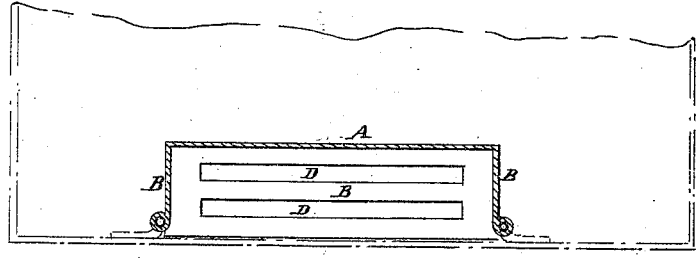
Figure 3:
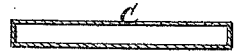

Be it known that I, EDWARD CHOATE, of New York, in the county of New York and State of New York, have invented a new and useful Improvement in Automatic Circulators for Wash-Boilers, of which the following is a specification:

Figure 1 is a detail longitudinal section of my improved device. Fig. 2 is a detail cross-section of the same taken through the line $x\,x$, Fig. 1. Fig. 3 is a detail cross-section of the discharge-pipe taken through the line $y\,y$, Fig. 1.

My invention has for its object to furnish an improved automatic circulator for wash-boilers, and other boilers and vessels in which steam is used as a cleansing, bleaching, or cooking agent, and which shall be simple in construction, convenient in use, and effective in operation; and it consists in the flanged plate provided with a discharge-pipe, and having one or more openings formed in the flange at the end of the plate furthest from the pipe, and half an inch (more or less) below the said plate as hereinafter described.

A represents a plate of any convenient size or shape. Around the edge of the plate A is formed a downwardly-projecting flange, B, as shown in Figs. 1 and 2. In the plate A, near one end, is formed a hole, in which is inserted a pipe, C, the upper end of which is curved, as shown in Fig. 1, so as to discharge the water upon the contents of the vessel in which the device is placed. In the flange B, at the end of the plate A furthest from the pipe C, are formed one or more openings, D, the upper one of which should be half an inch (more or less) below the plate A, as shown in Fig. 2, so that the part of the flange B above said opening may serve as a stop to the steam to prevent it from escaping through said holes, and to cause it to force the hot water up through the pipe C.

In using the device it is placed in the boiler or other vessel, over the hottest part of the fire, and as the water heats, the steam forces the water up through the pipe C, to be discharged upon the contents of said vessel. The water thus discharged passes down through the contents of the vessel and enters the chamber A B through the openings D, to be again heated and discharged through the pipe C.

A circulation is thus kept up without the use of any stops or partial partitions, volute or corrugated chambers, false or double bottoms, butterfly, floating, drop, or other valves, or any other of the numerous devices heretofore used for causing or securing a circulation.

The device may be kept in place upon the bottom of the vessel by being weighted or secured to lugs attached to said bottom, as indicated in dotted lines in Fig. 2.

Having thus described my invention, I claim as new and desire to secure by Letters Patent—

The flanged plate A B provided with a pipe, C, and having the openings D in the flange B at the end of the plate A furthest from the pipe C, and half an inch (more or less) below the said plate A, substantially as herein shown and described, and for the purposes set forth.

EDWARD CHOATE.

Witnesses:
JAMES T. GRAHAM,
T. B. MOSHER.